United States Patent [19]

Fuss et al.

[11] Patent Number: 4,506,609
[45] Date of Patent: Mar. 26, 1985

[54] TRASH SEEDER

[76] Inventors: Albert K. Fuss, 1 Jellicoe St.; Eric W. Fuss, 3 Heller St.; Jarvis R. Fuss, 143 Tourist Rd.; Roy M. Fuss, 21 Leslie St., all of Toowoomba, Queensland, Australia, 4350

[21] Appl. No.: 445,101

[22] Filed: Nov. 29, 1982

[30] Foreign Application Priority Data

Mar. 22, 1982 [AU] Australia ............................. PF3239

[51] Int. Cl.³ .............................................. A01C 5/00
[52] U.S. Cl. ....................................... 111/52; 111/85; 172/260.5; 172/413; 172/417; 280/414.5
[58] Field of Search ........................ 111/52, 85, 86, 87, 111/88; 172/400, 417, 401, 403, 405, 413, 240, 625, 414, 421, 462, 260.5, 500, 501, 624, 624.5, 657, 464; 280/414.5

[56] References Cited

U.S. PATENT DOCUMENTS

| | | | |
|---|---|---|---|
| 1,808,759 | 6/1931 | Bickerton | 172/260.5 |
| 2,379,779 | 7/1945 | Ash | 172/657 |
| 2,782,703 | 2/1957 | Chambers et al. | 172/657 |
| 3,314,386 | 4/1967 | Kopaska | 111/52 |
| 3,633,679 | 1/1972 | Dahlberg | 172/417 |
| 3,673,970 | 7/1972 | Hatcher | 111/85 |
| 3,749,035 | 7/1973 | Cayton et al. | 111/85 |
| 4,044,697 | 8/1977 | Swanson | 111/88 |
| 4,083,411 | 4/1978 | van der Lely | 172/417 |
| 4,141,302 | 2/1979 | Morrison et al. | 111/85 |
| 4,337,959 | 7/1982 | Bettin et al. | 172/401 |
| 4,338,872 | 7/1982 | Decker | 111/85 |

Primary Examiner—James R. Feyrer
Attorney, Agent, or Firm—Wm. T. Wofford; James C. Fails; Arthur F. Zobal

[57] ABSTRACT

An agricultural implement for seed planting having a series of independent planter units at the rear of a frame with the planter units connected to the frame in such a manner that the press wheels of the planter units form the rear wheels of the implement, the frame having forward wheels, and the series of independent units are interconnected through common hydraulic means to allow accommodation of ground irregularities without materially changing the downward loading on each independent unit.

5 Claims, 4 Drawing Figures

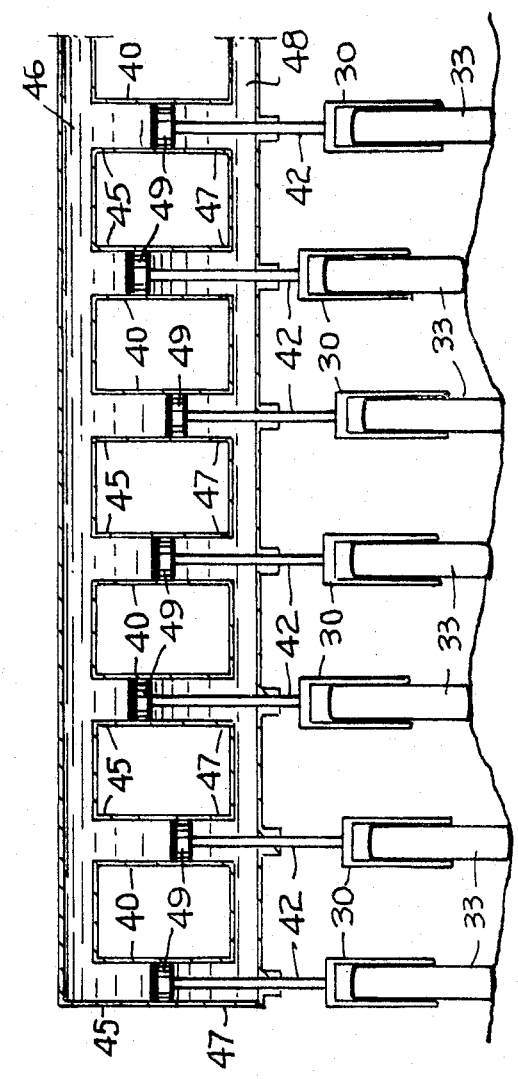

TRASH SEEDER

FIELD OF THE INVENTION

This invention relates to an improved seeder for agricultural use.

Seeders are known in which the seed and/or fertiliser are conveyed to seeder tynes which place the seed and fertiliser into the ground. Such tynes can conveniently be positioned behind a tyne which loosens the soil and prepares it for dropping the seed into the ground. The furrow so left is then usually closed by a compactor wheel following the seeding tyne.

It is necessary for proper growth that the seed be deposited at a very exact depth in relation to the surface of the soil and this has led to changes in seeders in which independent units were used which each comprised at least a sowing tyne and a compactor wheel hingedly connected to a frame so that the compactor wheel maintains the seeding tyne at a required depth, the seeding tyne often being adjustable in relation to the compactor wheel to enable this to be achieved.

The seed and/or fertiliser can then be supplied conveniently from what is known as an "air seeder unit" that is a unit which supplies measured quantities of seed and/or fertiliser blown through tubes to the independent seeding tynes.

Because of the cost of fuel and changing farming techniques which are taking place in agriculture, new and more specialised tillage implements are required which can be used with an air seeder to achieve the desired planting results.

OBJECTIVES AND SUMMARY OF THE INVENTION

The general object of this invention is to provide an improved machine in which accurate sowing depth is attained. A further object is to provide a machine for seeding into minimum or no-tillage trash farming.

A still further object is to provide a uniform loading on the press wheels by means of fluid loading.

These methods of farming endeavour to leave as much stubble and trash on top of the soil as possible to reduce soil erosion by both water and wind, and certain problems exist in being able to get seed and/or fertiliser into the soil under these conditions.

In the case of no-tillage farming it has been established that it is essential that the seed is placed at a desired depth into the soil, which means that the machine must be very flexible enabling it to follow any depression or contour and still plant the seed at the desired depth. This means that all machines that have been manufactured up to the present time with a frame carried on a number of wheels to control the depth, and tynes attached rigidly to the said frame, have had problems in that they were insufficiently flexible to maintain an even depth of sowing required for a no-tillage situation.

A normal seeding tyne assembly cannot operate effectively under such conditions, and according to this invention therefore the machine has been arranged to have a coulter or similar member for cutting through the trash and opening the ground for a narrow seeder tyne which then places the seed into the opening with minimum soil disturbance. The invention includes a press wheel following the tyne to press the soil over the seed, and as will be realised no further action such as harrowing or the like can be used as such an action would disturb the soil and rake up the trash which desirably must be held on the ground to avoid the referred to erosion.

The present invention consists of a main frame having wheels attached to the front which are adjustable for setting the depth of the front of the main frame, also having wheels attached to the rear which are well clear of the ground when the machine is in the seeding position, but the wheels at the rear operate with the front wheels to lift the main frame and seeding assemblies clear of the ground for transport, both forward and when being end towed.

The main frame has attached to it a number of independent seeding frames which preferably consist of a coulter, with limited caster, to cut through the trash and open the soil, a seeding tyne being disposed just to the rear of this coulter to place the seed at the required depth in the opening formed by the coulter. A press wheel follows the seeding tyne to press the soil around the seed.

As the back wheels are clear of the ground when seeding, the weight of the machine is carried on the seeding assemblies, that is the coulters and press wheels as well as the front wheels of the machine.

The press wheels are loaded by hydraulic means to maintain a uniform pressure on the assemblies in spite of irregularities in the ground.

In its preferred form the invention comprises an agricultural implement having a main frame supportable on ground wheels but having a series of laterally spaced independently connected seeder units each having a furrow-forming device followed by a seed delivering tube followed in turn by a press wheel to close the furrow over the seed, the seeder units being arranged to support the rear of the frame when the rear wheels of the implement are raised so as to cause the press wheels to form the rear wheels of the frame, a piston and cylinder being connected to each seeder unit with at least the top of each cylinder joined to a common manifold and preferably the bottom of each cylinder joined to a common, but independent, manifold whereby the frame is supported on forward wheels and on the press wheels to give uniform loading on all the press wheels irrespective of ground contour.

BRIEF DESCRIPTION OF THE DRAWINGS

FIG. 4 shows the diagrammatic section the fluid pressure assembly for the press wheels.

DESCRIPTION OF PREFERRED EMBODIMENT

Figure 1:
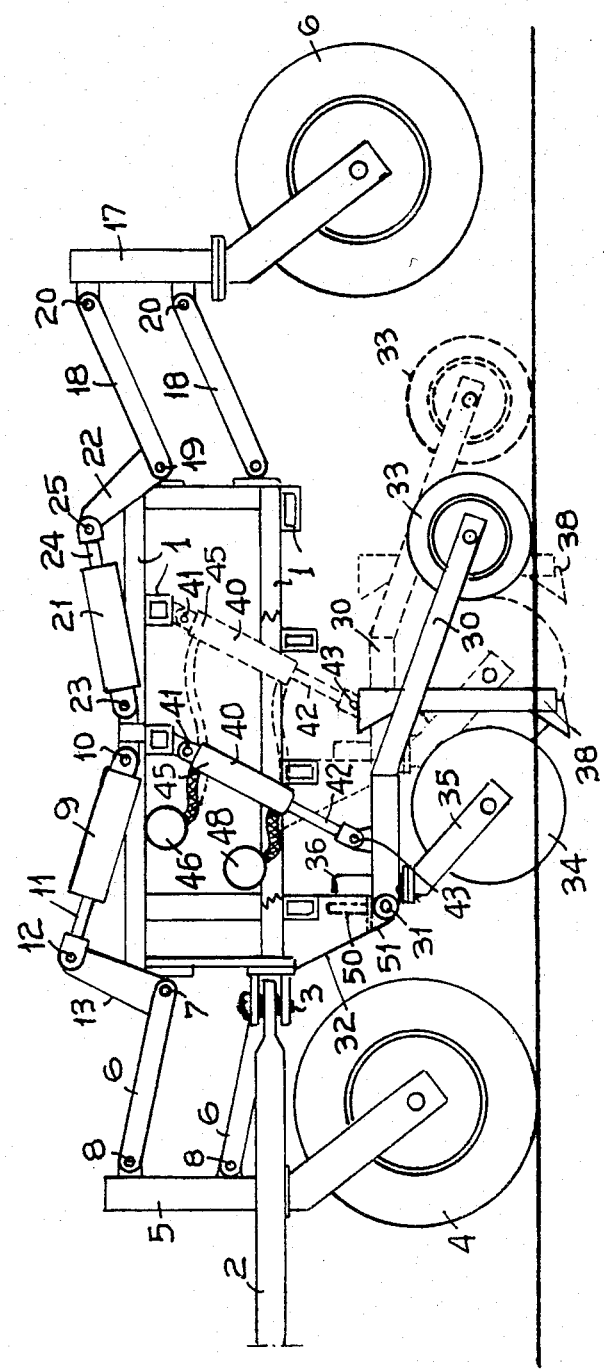
FIG. 1 is a side elevation of a seeder with part of the frame cut away and with the machine in operational position as when sowing, but omitting the seed and fertiliser supply means and the air hoses therefrom.
Figure 2:
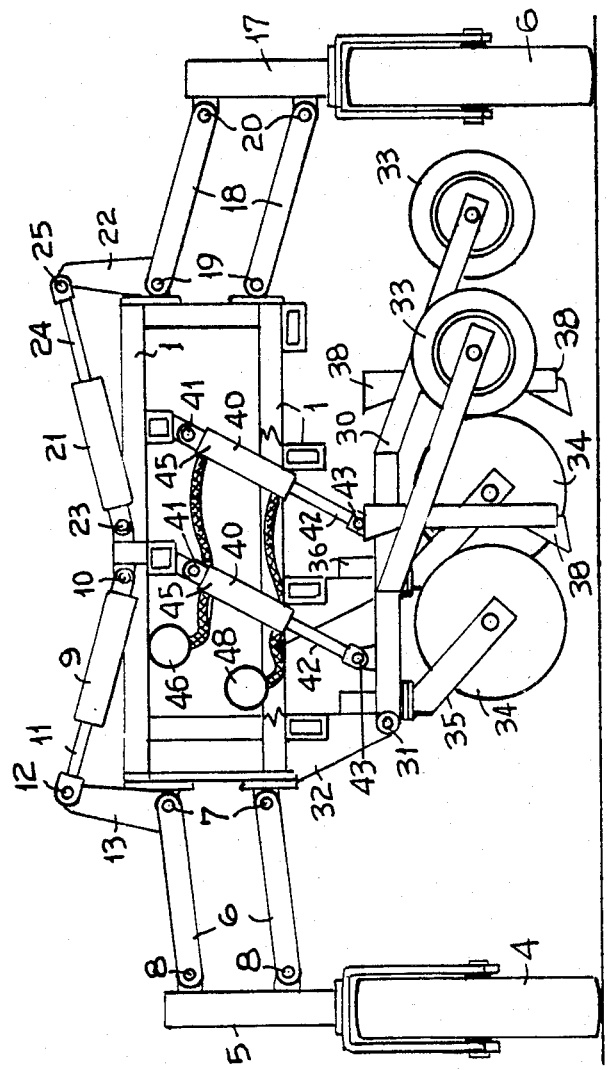
FIG. 2 is a similar view but showing the seeder in transport position.
Figure 3:
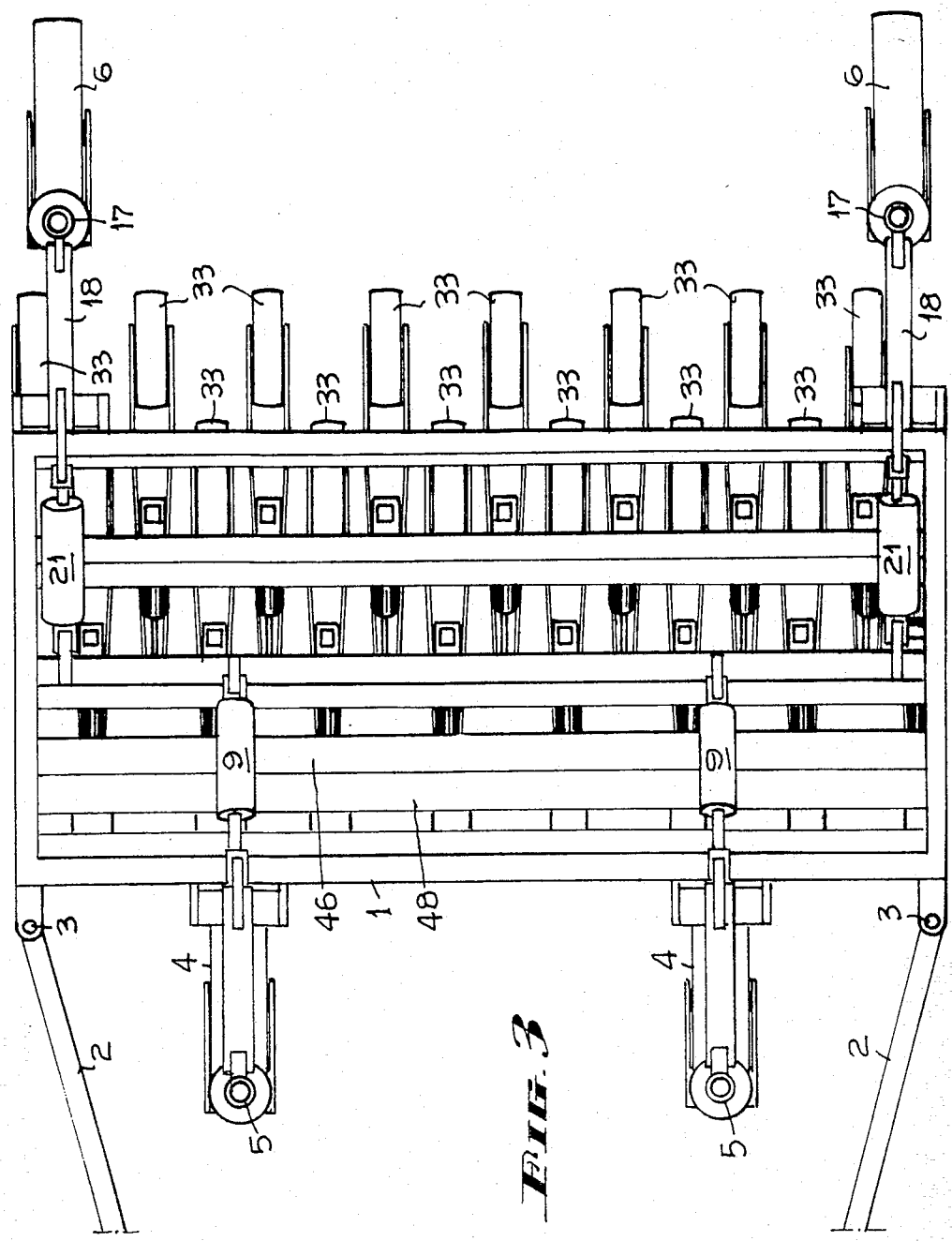
FIG. 3 is a plan view of the seeder.

The frame 1 has at a forward end a pair of draft bars 2 connected to the frame by pins 3. These draft bars 2 are in use when the seeder is in actuation but are removed when the seeder is to be transported, at which stage the frame 1 is drawn at right angles to the working position.

The frame 1 is supported at the forward part by a pair of caster wheels 4, which have their caster bearings 5 supported from the frame 1 by pairs of arms 6 having pivot pins 7 and 8 engaged respectively on the frame 1 and the caster bearings 5 so that a parallel motion assembly is formed which allows the frame 1 to be raised and lowered by means of hydraulic rams 9 having their cylinders connected by pivot pins 10 to the frame 1, and the piston rods 11 connected by pivot pins 12 to levers 13 which connect to the arms 6. The rear part of the frame 1 is similarly supported by a pair of caster wheels 16, having their caster bearings 17 connected to the frame 1 by pairs of arms 18 connected by pivot pins 19 and 20 respectively to the frame 1 and caster bearings 17, hydraulic rams 21 actuating the arms 18 through levers 22, the cylinder of the rams 21 being connected to the frame 1 by pins 23, the rods 24 being connected to the levers 22 by pins 25.

The seeding assemblies comprise frames 30 connected at the front end by pivot pins 31 to brackets 32 projecting downwardly from the frame 1.

The frames 30 each have a press wheel 33 at the rear end and a coulter 34 carried on a caster bracket 35 rotationally mounted in a caster bearing 36 secured to the frame 30.

The seed delivery tube 38 of each seeding assembly is secured to the frame 30 immediately behind the coulter 34 and thus between the coulter 34 and the press wheel 33 so that the coulter opens up a furrow and seed and/or fertiliser are discharged into the furrow by the seed delivery tube 38 and the press wheel 33 then presses the displaced soil on to the seed and/or fertiliser.

The seeding assemblies are, as shown, connected to the main frame 1 by the pivots 31 allowing their trailing frames 30 to jump vertically, and a hydraulic ram 40 connects each of the seeding assemblies with the frame 1. To be able to get relatively close spacing of each of the seeding assemblies without trash movement problems, these can be staggered alternately to give more room for each of the units to act in an independent manner and to be controlled by the hydraulic ram, the alternate assemblies being shown dotted in FIG. 1 for the sake of clarity.

It will be noted that each hydraulic ram 40 has its cylinder connected by a pivot pin 41 to the frame 1, and its piston rod 42 connected by a pivot pin 43 to the frame 30 of the seeding assembly.

The rams 40 are all connected bases 45 to a header 46 and rod ends 47 to a header 48, and the fluid which operates the hydraulic rams 40 is pumped into the system until each piston 49 is positioned approximately to the centre of its stroke.

By such an arrangement each seeding frame has the same pressure or weight carried on the coulter 34 and press wheel 33, but the trailing parts of the seeding frames are able to follow any depression or contour in the ground. Seeding assemblies can jump independently, compressing rams which discharge hydraulic fluid into a header. The hydraulic fluid in the rod ends 47 of the rams 40 and the header 48 connected thereto is under low pressure and flows in reverse direction during this action, extending the other rams and making it very flexible in its operation, but the arrangement assures that the pressure remains constant in the system, maintaining the same loading on all the press wheels 33 as is the case when the machine is on a level ground surface.

The system differs in that generally the hydraulic system used previously by agricultural machines have a master cylinder and a ram attached to each tyne assembly and the system is pressurised to lock the tyne assembly onto a stop or frame so that maximum pressure can be applied to each assembly cylinder. The pistons in the cylinders are at maximum stroke, and when the tyne jumps an object and tyne cylinder is compressed, the hydraulic fluid is displaced from the ram to discharge into the master cylinder which has a spring damper. This increases the pressure in the rams until the tyne which has jumped an object returns to its stop. According to the prior art systems the arrangement is one intended to keep the tyne assemblies as rigid as possible at all times.

According to the present invention the system is arranged to allow a seeding assembly to compress the rams and displace the hydraulic fluid into other rams that extend, allowing free movement of the assemblies at all times to follow the ground contour over which the machine is travelling, but retaining the same pressure on each seeding assembly at all times.

A machine constructed according to our invention can therefore conveniently comprise forward ground wheels 4 which support a main frame 1 to which the various subsections of the machine are joined and these front wheels 4 caster and are provided with raising and lowering means in relation to the frame such as the hydraulic ram 9 shown.

The rear wheels 6 of the frame, which are only for the purpose of transporting the frame by allowing the forward and rear wheels to be lowered to raise the tilling section, are also caster wheels and are mounted on parallelogram arms 18 from the main frame 1 and provided with hydraulic control means such as the ram 21.

When in seeding operation the front wheels 4 support the frame 1 but the rear of the frame is supported collectively by the sub-assemblies each of which is of a width only sufficient to form one furrow and to plant the seed and distribute the fertiliser, and as previously said these may be staggered alternately to allow closer spacing to be obtained if this is necessary.

Each of these sub-assemblies as said has a frame section 30 hinged at its forward end to a bracket 32 of the main frame 1 but instead of using transverse pivots 31 as shown, a further vertical pivot can be included to allow castering of the seeding assemblies about their forward support, see slotted caster pin carrying a mount 51 for the pin 31 (FIG. 1).

From the foregoing it will be realised that a highly effective machine is provided in which the frame is supported only on forward wheels 4 and the rear of the frame 1 floats on the seeding assemblies through the connection of the seeding assemblies to the frame 1 by the hydraulic rams 40. As stated earlier this type of suspension allows the independent seeding assemblies to follow ground contours very accurately because each of the assemblies is under control of the compaction wheel 33 with substantially uniform loading irrespective of the height of the assemblies in relation to the other seeding assemblies of the machine in that the tops of each of the rams 40 are connected to one common header 46 and the bottoms of the rams 40 are connected to another separate header 48 so that the hydraulic fluid in the rams can be kept at a substantially uniform pressure by all fluid displacement being from one ram to the next. As the two headers 46 and 48 can be under rigid control so far as hydraulic fluid volume and pressures are concerned the pressures can be selected to ensure that all the seeding assemblies including the seeder tyne 38, the coulter wheel 34, and the compactor wheel 33, rise and fall independently about the forward pivots 31 of their seeding assemblies to maintain very accurate planting depth beneath the trash covering on the surface of the soil.

It should be appreciated that the above system is closely linked to its use with air seeders because machines of this nature have a considerable number of points which have to be supplied with seed and/or fertiliser and which, as said, operate independently in height adjustment through following the contours of the ground and it would be very difficult to use any form of supply of material because firstly there are a number of points to be fed but most importantly the unit containing the seed and/or fertiliser should be separate from the frame of the implement to avoid excessive loading.

When a separate air seeder unit is involved the weight of the unit whether it be full or empty of seed and/or fertiliser does not affect the weight on the frame of the machine and this is most important and enables the use of the hydraulic system described in which the tops of the rams 40 are connected in common to the one the header 46 and the bottoms of the rams are connected to a second header 48 independent of the first header 46 with a pressure supply arranged so that the pistons in the cylinders of the rams can be held at an intermediate level during operation so that, as it were, each piston in each cylinder of each ram can load the seeder unit to which it is coupled in an effective manner and in a uniform arrangement which allows ready following of the contours of the ground while maintaining a required pressure on the seeder unit.

While the invention has been described with particular reference to "air seeders," it will be appreciated that the invention is not to be limited thereto but can be applied to other conventional seeders such as the box seeders in which the seed and/or fertiliser falls by gravity to the seed delivery tube.

We claim:

1. An agricultural implement comprising in combination: a main frame, forward caster wheels on height adjusting extensions pivoted on the said main frame to project forwardly from said frame to control the height of the front of the said main frame, hydraulic means to actuate the said extensions, a series of seeding units spaced transversely along the said main frame and supported on respective trailing frames each of which is connected at a forward part to the said main frame by at least a transverse pivot pin, ground opening and seeding devices on each said trailing frame intermediate the ends thereof, a series of press wheels arranged one on the rear part of each said trailing frame, hydraulic means between each said trailing frame and the said main frame rearward of the said pivot pin to support the weight of the rear part of the said main frame from the said press wheels, but to allow each said press wheel to accommodate to inequalities in ground height, said hydraulic means comprising hydraulic rams each connected to at least a common header extending transversely across the said main frame to allow each said press wheel to accomodate to inequalities in the ground height, rear caster wheels on height adjusting extensions also pivoted on the said main frame to project rearwardly from said main frame to support the rear of the said main frame during transport but arranged to be lifted from ground contact during seeding, to transfer the weight of the main frame to the said press wheels, and hydraulic means to actuate the said last mentioned extensions.

2. An agricultural implement according to claim 1 wherein said hydraulic means comprises a second header containing a hydraulic fluid source extending transversely across the said frame and connected in common to the opposite end of each said hydraulic ram so as to lift the said trailing frames to bring the said press wheels clear of the ground when the said rear caster wheels are lowered for transport.

3. An agricultural implement according to claim 1 wherein each said trailing frame carries a coulter and a seed delivery chute to form the said ground opening and seeding devices and the said press wheel, the said coulter being mounted on a vertical pin on the said trailing frame to caster and the said seed delivery tube and press wheel trailing the said coulter.

4. An agricultural implement for trash seeding comprising: a generally rectangular main frame, a series of seeding units spaced transversely along the said frame each comprising a trailing frame, horizontal hinge means between a forward part of each trailing frame and the main frame to allow the rear part of the said trailing frames to rise and fall, a coulter supported by vertical hinge means near the forward part of each said trailing frame to caster, a seed and/or fertilizer delivery tube rearward of the said coulter on each said trailing frame, a press wheel on each said trailing frame at a rear part thereof, caster wheels forward of the main frame connected to the said main frame by extensions pivoted at their rear to the said main frame hydraulic rams coupled between the said extensions and the main frame to raise and lower the forward part of the main frame about the said transport wheels, hydraulic rams for each trailing frame connected between the said main frame and each said trailing frame rearward of the said horizontal hinge means, means placing a header which extends transversely across the main frame into communication in common with each of the said last mentioned hydraulic rams, said header being connectable to a source of variable pressure to support the rear part of the main frame from the said press wheels during seeding, draft means for the said main frame having hinge means between the said main frame and the said draft means to allow the main frame to be supported forwardly by the said transport wheels and rearwardly by the said press wheels, the said pressure in the said header being selectable to cause the said rams to be at an intermediate extension but allowing each said press wheel to accommodate to irregularities in the ground by transferring hydraulic fluid from any ram meeting obstruction to other rams of the header, and caster wheels rearward of said frame arranged to be supported on extensions which are pivoted at their forward ends to the said main frame, hydraulic rams connected between the said extensions and the said main frame whereby the said rear wheels are raised from the ground during seeding to transfer the weight of the rear part of the said main frame to the said press wheels.

5. An agricultural implement according to claim 4 characterised by a second header also extending transversely on the said main frame, and means connecting the said second header to each said hydraulic ram to raise the said trailing frames about their pivotal connection to the said main frame during transport to raise the said press wheels from the ground.

* * * * *